Sept. 26, 1939.   G. H. HUTAFF, JR   2,174,211
DECOY
Filed June 17, 1939   5 Sheets-Sheet 1
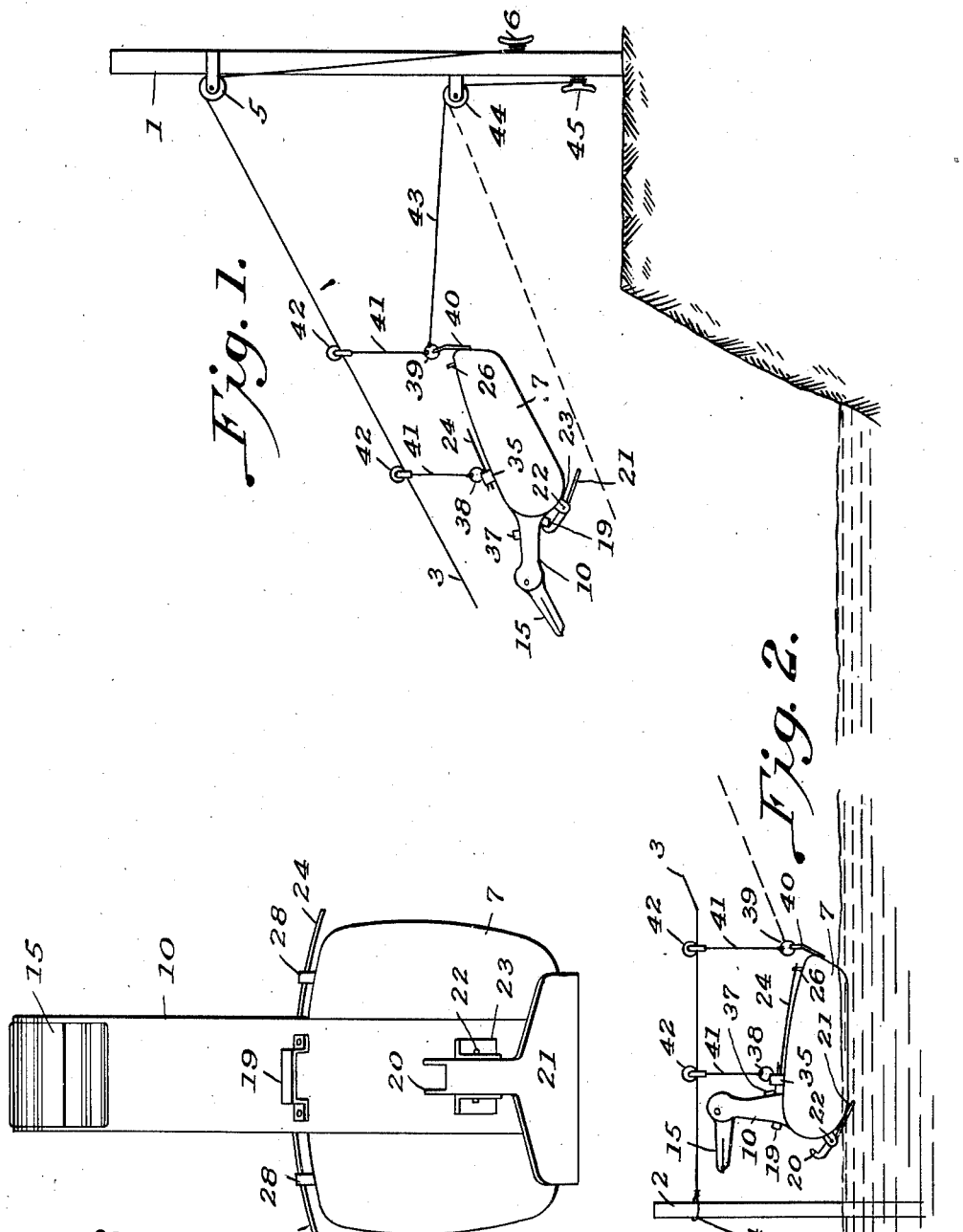
Inventor
GEORGE H. HUTAFF, JR.
By Milams & Milams
Attorneys Sept. 26, 1939.   G. H. HUTAFF, JR   2,174,211
DECOY
Filed June 17, 1939   5 Sheets-Sheet 2

Inventor
GEORGE H. HUTAFF, JR.

By Milano & Milano
Attorneys

Sept. 26, 1939.  G. H. HUTAFF, JR  2,174,211
DECOY
Filed June 17, 1939  5 Sheets—Sheet 3
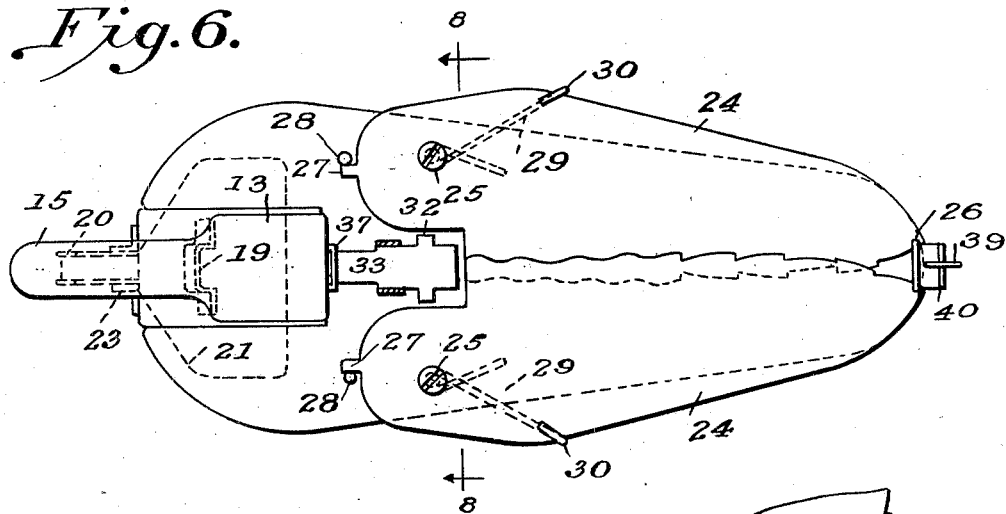
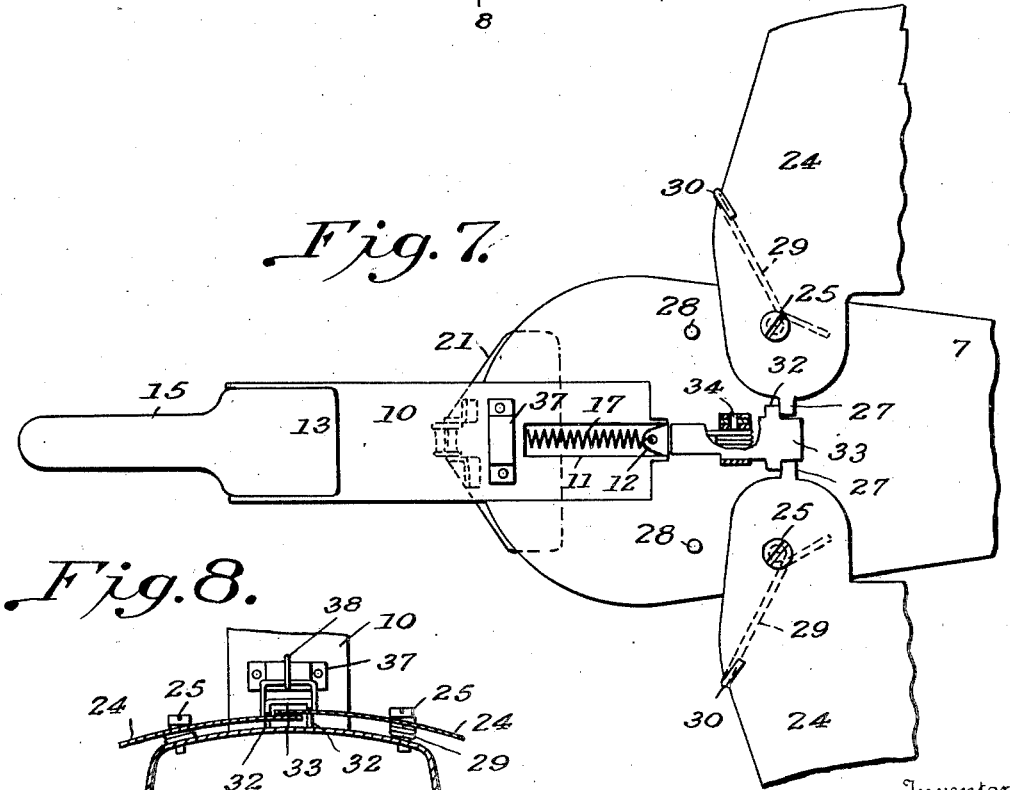
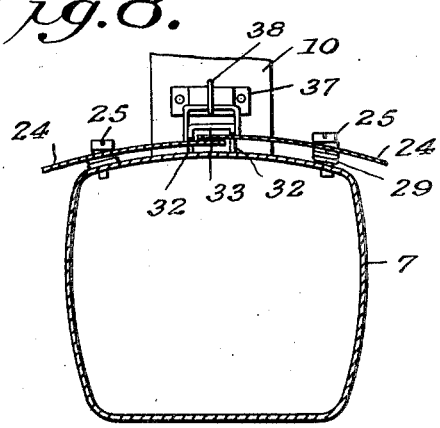
Inventor
GEORGE H. HUTAFF, JR.
By Milans & Milans
Attorneys Sept. 26, 1939.  G. H. HUTAFF, JR  2,174,211
DECOY
Filed June 17, 1939   5 Sheets-Sheet 4

Inventor
GEORGE H. HUTAFF, JR.

By Milans & Milans
Attorneys

Sept. 26, 1939.    G. H. HUTAFF, JR    2,174,211
DECOY
Filed June 17, 1939    5 Sheets-Sheet 5

Inventor
GEORGE H. HUTAFF, JR.

By Milans & Milans
Attorneys

Patented Sept. 26, 1939

2,174,211

UNITED STATES PATENT OFFICE 2,174,211

DECOY

George H. Hutaff, Jr., Wilmington, N. C.

Application June 17, 1939, Serial No. 279,758

14 Claims. (Cl. 43—3)

My invention relates to new and useful improvements in a decoy and more particularly to a duck decoy, the principal object of the invention residing in the provision of a device of the character described which is formed and adapted to simulate the movements of a duck in flight, while landing on the water, and while floating or sitting on the water.

Another object of the invention consists in the provision of a decoy of the character described in which wings are provided, said wings being normally held in un-spread position to extend over and parallel with the body but adapted to be spread to simulate a duck in flight, means being also provided to automatically release the spread wings when the decoy hits the water, the released wings returning to their normal un-spread positions.

A still further object of the invention resides in the provision of a decoy of the character described having an adjustable neck and head portion, the neck portion normally extending substantially vertical with the head portion at the upper end and the bill of the head extending horizontal as is the case with the neck and bill of a duck when not in flight, the neck being adapted to be adjusted so that it will extend upwardly at an angle with respect to the body with the head adjusted so that its bill will remain horizontal as is the case when a duck is in flight, means being provided to hold the neck and bill in either of their adjusted positions, the holding means for the flight positions being automatically released when the decoy hits the water in lighting.

Still another object of the invention consists in the provision of a decoy of the character described including adjustable wings, neck portion and head, and means for holding the adjustable wings, neck portion and head in either of their positions to simulate a duck in flight or while at rest, the means which holds the parts in flight simulating positions being automatically released as the decoy hits the water.

Another object of the invention resides in the provision of one form of decoy in which a frame structure is provided for holding and supporting a dead duck, the decoy further including adjustable wings, neck portion and head, adapted to be positioned to simulate corresponding parts of a live duck when in flight or when at rest, the neck portion of the decoy being formed and adapted to receive the neck of the dead duck while the bill, forming a part of the head portion of the decoy, is formed and positioned to receive the bill of the dead duck.

As another object of the invention I provide a support for the decoy, said support permitting the decoy to move thereover to simulate a duck in flight, and further formed to support the decoy after it has hit the water to simulate a floating duck not in flight.

With the above and other objects in view, which will appear as the description proceeds, my invention consists in the novel details of construction, and arrangement of parts, which will appear from the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a side elevation showing the decoy in flight.

Fig. 2 is a side elevation showing the decoy at rest.

Fig. 3 is a front elevation of the decoy.

Fig. 6 is a top plan with parts broken away and the wings, neck and head portions in their normal rest position.

Fig. 7 is a fragmental top plan with parts broken away showing the wings, neck and head portions, in their adjusted flight positions.

Fig. 8 is a fragmental transverse vertical section on the line 8—8 of Fig. 6 looking in the direction of the arrows.

Figure 4:
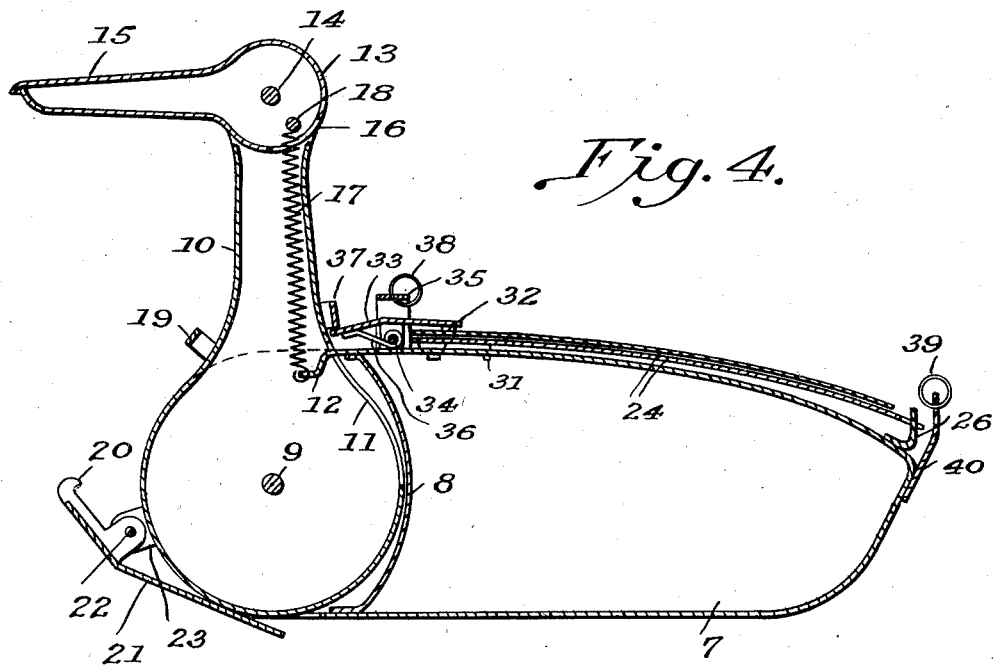
Fig. 4 is a longitudinal vertical section through the decoy, with parts shown in their positions while the decoy is at rest.

In carrying out my invention I position a standard or post 1 on the bank at the edge of the watercourse and a second post or standard 2 is positioned in the water and driven into the bed of the watercourse or secured in other suitable manner. A wire or cable 3 has what might be termed its lower end secured to the standard or post 2, as shown at 4, and this wire or cable extends upwardly at an angle and passes over a pulley 5, secured to the post or standard 1, and then passes down and is wrapped around the member 6, as shown quite clearly in Fig. 1 of the drawings. In Fig. 1 I have shown the decoy suspended from the inclined wire or cable 3 and as the decoy passes downwardly over the wire or cable, by gravity, the decoy simulates the movement of a duck in flight. In Fig. 2 of the drawings I have illustrated the decoy after hitting the water and assuming a floating position thereon and the weight of the decoy will cause the wire or cable 3 to assume the substantially horizontal position shown in Fig. 2, adjacent the post or standard 2.

The decoy includes the body portion 7, which is preferably formed of tin or other relatively light material, and this body portion is, of course, air-tight so that it will readily float upon the water. Set inwardly from what might be termed the front end of the body is a partition 8 and pivotally mounted on the transversely extending rod or pin 9, between the side portions of the body, forwardly of the partition 8, is the neck portion 10, of the shape shown, and this neck portion is formed with the elongated opening 11 in which projects the extending portion 12 of the top of the body 7, as is quite clearly illustrated in Figs. 4 and 5 of the drawings. At the upper end of the neck portion 10, the head portion 13 is pivotally mounted on the transversely extending pin or rod 14, the head 13 including the bill portion 15. The head 13 is formed with the elongated opening 16 and extending through this opening is the upper end of a coiled spring 17 connected to the pin or projection 18 mounted in the head. The opposite end of the spring is connected to the extension 12 of the body. The spring 17 normally holds the neck and head in the positions shown in Fig. 4 of the drawings or in the positions which they will assume after the decoy has contacted the water and is in what might be termed rest or floating position.

Secured to the forward face of the neck 10 is the member 19 which is adapted to be engaged by the hooked end 20 of the apron or latch 21 which is pivotally connected at 22 to the lugs or projections 23 formed on or secured to the lower portion of the neck. Normally, as stated, the neck and head will be in the position shown in Fig. 4, but when the parts are to be positioned to simulate the positions while in flight the bill 15 will be pulled forwardly to swing the neck and head into the positions shown in Fig. 5 against the tension of the spring 17 and the member 19 will be engaged by the hooked end 20 of the latch or apron 21. When the apron contacts the water it will be swung on its pivot 22 and release the hook from the member 19. The coiled spring 17 will then draw the parts back into the initial positions shown more particularly in Fig. 4 of the drawings.

Wings 24 are pivotally connected to the body 7, by means of the screws or pins 25, and when in non-flight position the inner edges of the wings will overlap, as shown more particularly in Fig. 6 of the drawings, with the rear ends of the wings engaged under the head of a T-projection 26. Each of the wings is formed on its forward end with a projection 27, and these projections normally engage the pins 28 which limit the swinging movement of the wings in closing or assuming the positions shown in Fig. 6. The wings are normally held in their non-flight or closed position by means of the springs 29, one end of each of the springs being bent upwardly, as shown at 30 to engage the outer edge of the wing while the opposite end of each spring is wound around one of the screws or members 25 and then has its end bent downwardly to form a projection 31 which engages in an opening formed in the top of the body. The wings are adapted to be swung into opened or their flight positions, against the action of the springs 29, as shown in Fig. 7 of the drawings and when in these positions the projections 27 are adapted to be engaged in front of the downwardly extending projections 32, formed on the latch 33 pivotally connected at 34 to the bracket 35. The end of the latch 33, having the projections 32, is normally held in lowered position by means of the spring 36, as shown more particularly in Figs. 4 and 5 of the drawings.

A projecting member or eye 37 is formed on or secured to what might be termed the rear face of the neck 10 and when the neck is in its raised position, shown in Fig. 4 of the drawings, the projection 37 will engage the forward end of the latch 33 to force the same downwardly to release the projections 32 from the projections 27 of the wings 24 and permit the wings to return to their normal closed position under the action of the springs 29.

A ring 38 is carried by the bracket 35 and a similar ring 39 is carried by the plate 40 secured to the rear end of the body 7. Secured to each of these rings 38 and 39 is a wire or cord 41 which have connected to their upper ends a pulley 42 adapted to operate over the wire or cable 3. Also connected to the ring 39 is a cord or cable 43 which passes over the pulley 44, carried by the standard or post 1, and is adapted to be connected to the member 45 also carried by the post or standard 1.

Figure 5:
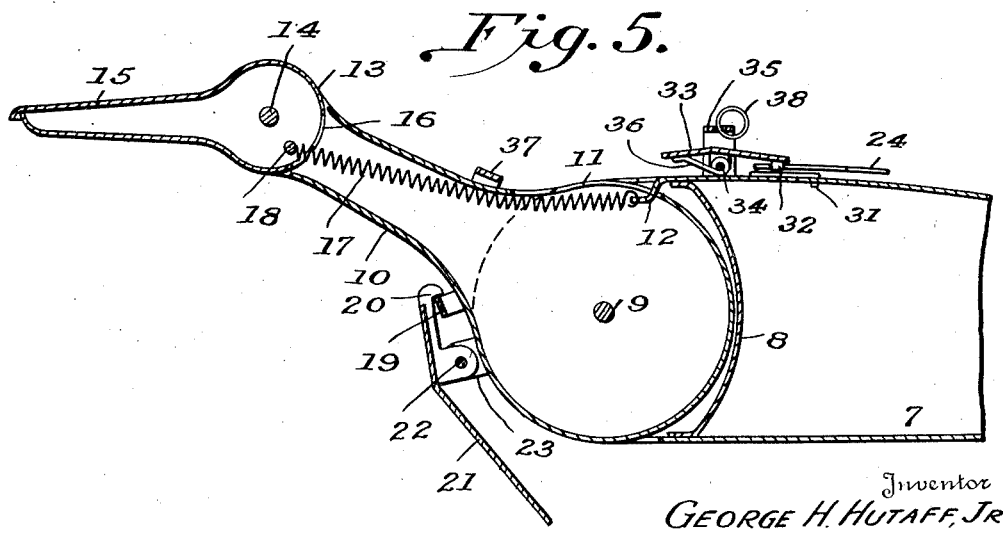
Fig. 5 is a fragmental longitudinal vertical section through the decoy with the parts shown in their positions while the decoy is in flight.
Figure 9:
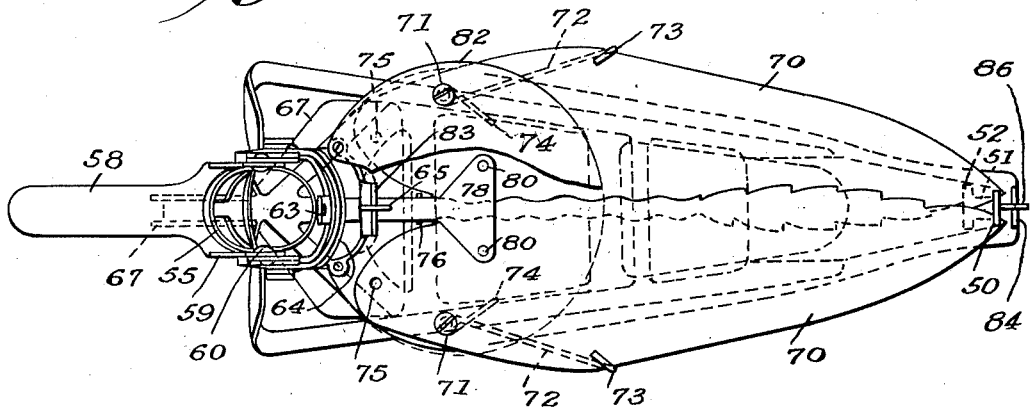
Fig. 9 is a top plan showing a slightly modified form of the invention, parts being shown in their normal rest position and parts broken away for the sake of clearness.
Figure 10:
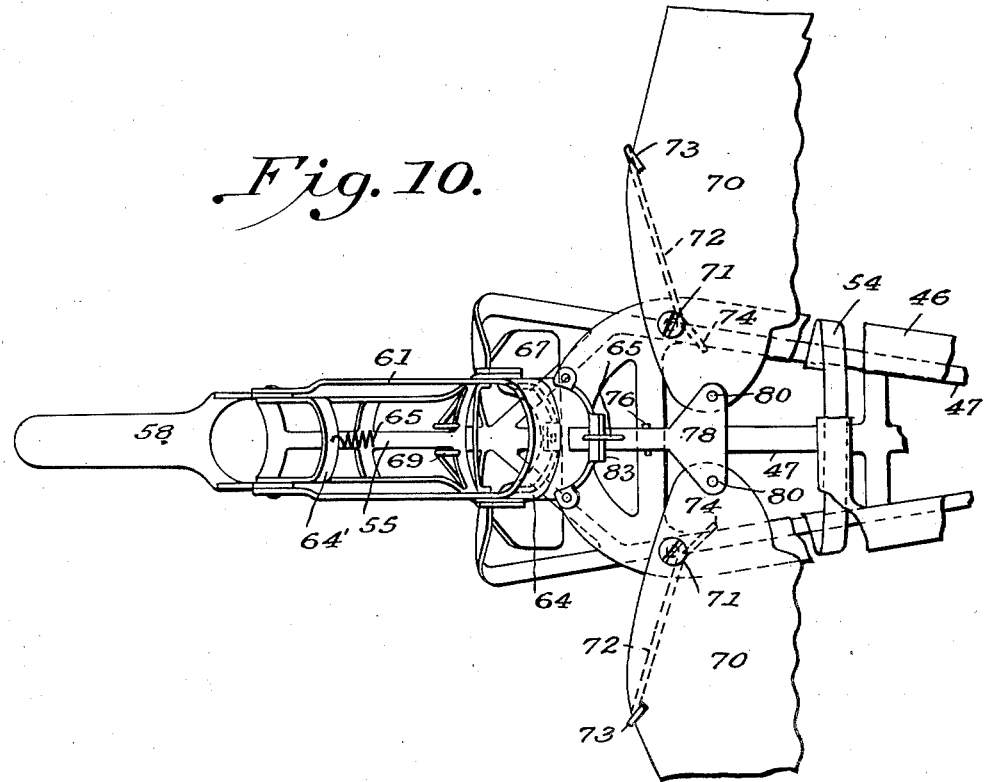
Fig. 10 is a fragmental top plan, with parts broken away and parts removed for the sake of clearness, the wings, neck and head portions being shown in their adjusted flight positions.

From the above detailed description it is thought that the construction and operation will be clearly understood. As has been stated the decoy is formed and adapted to simulate the movements of a duck when in flight and after striking the water floating thereon. Normally the parts will be in the positions shown more particularly in Figs. 2, 3, 4 and 6 of the drawings. When the decoy is to be used to simulate the movements of a duck in flight the user will grasp the bill 15 of the head portion 13 and on pulling the same forwardly the head 13 and neck 10 will assume the positions shown more particularly in Figs. 1 and 5 of the drawings. The spring 17 will be placed under tension, as shown in Fig. 5 and the hook 20 of the apron or latch 21 will engage the member 19 to hold the neck in its lowered position. The operator or user will then spread the wings 24 into the positions clearly illustrated in Fig. 7 of the drawings and the projections 27 of the wings will engage in front of the projections 32 of the latch 33 with the springs 29 under tension. The spring 36 holds the latch in its wing-engaging position. The decoy will be drawn to the upper end of the cable 3 by the rope or cable 43. When the rope or cable 43 is released the decoy will pass down or over the wire or cable 3 and when the apron or latch 21 engages the water the hook 20 will be released from the member 19 and the neck 10 and head 13 will be drawn upwardly into the initial positions by the spring 17. As the neck assumes its initial vertical position the member 37 engages the forward end of the latch 33 and raises the opposite end of the latch to release the projections 32 from the projections 27 of the wings. When thus released the springs 29 will return the wings to their closed or non-flight positions and the closing movement will be limited by engagement of the projections 27 with the pins or projections 28. The decoy will float upon the water, as shown in Fig. 2 of the drawings, and it will be understood that the decoy may be painted suitable colors to simulate the colors of a duck.

In Figs. 9 to 12 inclusive of the drawings I have illustrated a slightly modified form of my invention which while embodying the same features of operation shows the body portion in the form of a frame for supporting a dead duck as distinguished from the air-tight type of body illustrated in Figs. 1 to 8 inclusive. In this modified form of the invention the neck is also formed to receive the neck portion of the dead duck and the bill forming a part of the head of the decoy is adapted to support the duck's bill. As stated, the body of the decoy is in the form of a frame and includes the top portion 46 and bottom portion 47, the bottom portion being pivotally connected, for swinging movement, to the top portion at 48. The rear end of the bottom portion 47 is bent upwardly, as shown at 49, and is formed on its upper end with a T-shaped projection 50 which extends through the T-slot 51, as shown more particularly in Fig. 11 of the drawings. Normally the parts are shown in the position disclosed in Fig. 11 by full lines, but when it is desired to separate the frame portions the end 49 is pressed inwardly, it being flexible, so that the T-projection 50 will slide in the opening 51 until it reaches the inner end thereof and then the widened portion of the projection 50 may be removed through the widened portion of the T-slot which is indicated at 52 more particularly in Fig. 9 of the drawings. When thus positioned the bottom portion 47, of the frame, may be swung on its pivot 48 to the position shown by dotted lines in Fig. 11 and the body of the dead duck, indicated by dotted lines at 53, is inserted between the top and bottom portions and clamped therebetween when the parts are returned to their normal positions. Spring arms 54 are carried by the top portion 46 and are adapted to extend around the sides of the duck body. Also mounted on the pivots 48 is the semi-circular elongated neck portion 55 which will receive the neck of the dead duck, as shown in dotted lines in Figs. 11 and 12, and pivotally connected to the upper end of the neck portion, at 56, is what might be termed the head 57 of the decoy which includes the bill 58 on which the bill of the dead duck will rest. The head portion 57 includes the upwardly extending side portions or lugs 59 to each of which is pivotally connected at 60 a rod or bar 61, the opposite ends of which are pivotally connected at 62 to an upwardly extending projection 63 formed on the top frame portion 46. A curved bar or member 64 is connected to or formed as a part of the lower ends of the bars or rods 61 and operates with the bars on the pivots 62. The purpose of this member will be later brought out. Formed as a part of the neck portion 55, or secured thereto in any desired manner, is a semi-circular band shown at 64' and secured to this bar is one end of a coiled spring 65, the opposite end of which is connected to a projection 66 extending upwardly from the top portion 46 of the body frame.

Figure 11:
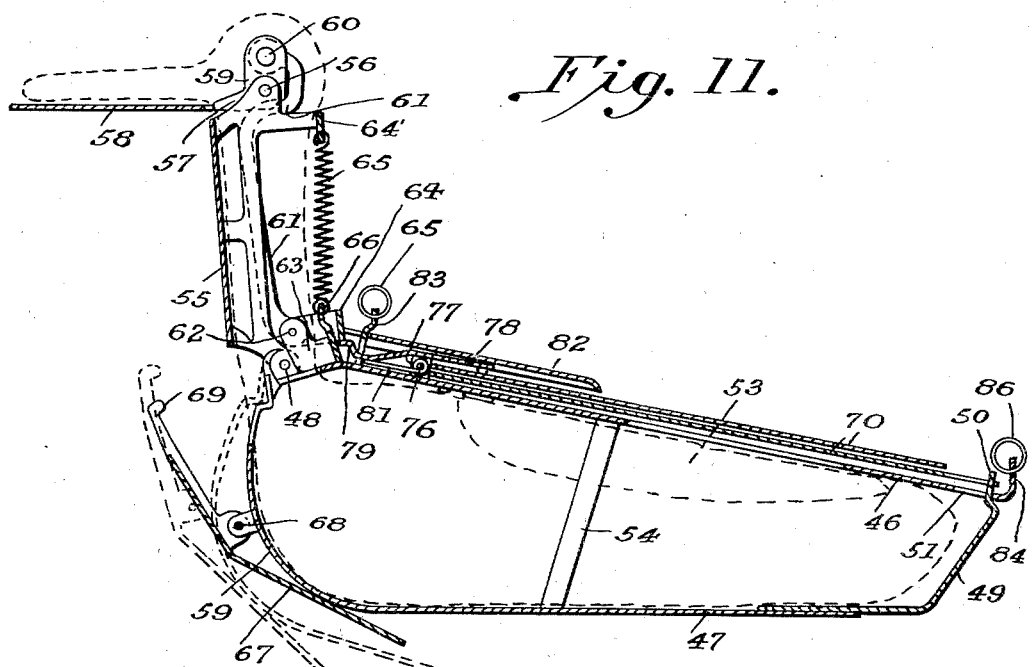
Fig. 11 is a longitudinal vertical section through the decoy shown in Fig. 9 with the parts in their non-flight or rest positions and an outline of a dead duck shown by dotted lines.
Figure 12:
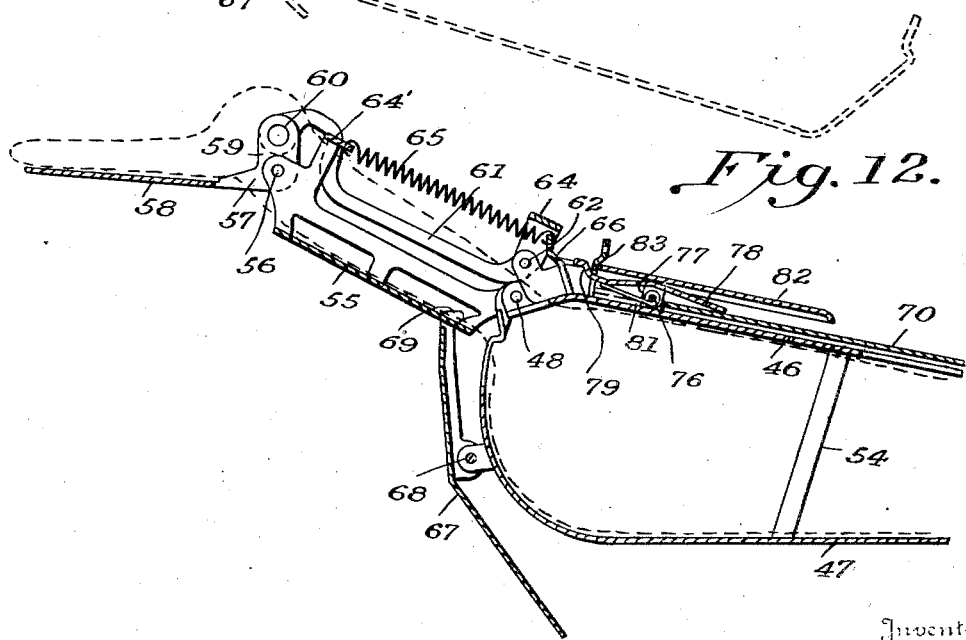
Fig. 12 is a fragmental longitudinal vertical section through the decoy shown in Fig. 9 with parts shown in their flight positions similar to the position shown in Fig. 10.

This coiled spring 65 normally holds the neck and head portions in the positions shown more particularly in Fig. 11 of the drawings, but permits them to be extended into the positions shown in Fig. 12, it being understood that the spring will be placed under tension when the parts are in the positions in Fig. 12. For holding the neck in its extended or lowered position, shown in Fig. 12, I provide the apron or latch member 67 which is pivotally connected at 68 to the lower portion of the body frame. This apron or latch is formed on its upper end with hooks 69, these hooks being adapted to engage an edge portion of the neck, as shown more particularly in Fig. 12 of the drawings. When the decoy reaches the water the latch or apron 67, being contacted, at its lower end, will release the hooks 69 from the neck portion and permit the spring 65 to draw the parts back into their normal positions.

Wings 70 are pivotally connected at 71 to the upper frame portion 46 of the body frame and when in their closed or non-flight positions extend over the body frame, as shown more particularly in Fig. 1 of the drawings, with their inner edges overlapping and their outer ends received beneath the T-shaped projection 50, formed on the extension 49 of the frame portion 47. These wings are normally held in their closed or non-flight positions by the springs 72 which are wound around the pivot members 71 with the outer ends thereof bent to engage the edges of the wings as shown at 73 and their inner ends formed to engage edges of the frame portion 46 as is quite clearly illustrated more particularly in Figs. 9 and 10 of the drawings at 74. Each of the wings 70 is formed with a perforation 75 for a purpose which will be later brought out.

Pivotally connected at 76, to the upwardly extending lugs or projections 77, is a latch in the form of a lever 78 having formed at one end a raised portion 79 and at its opposite end having the transversely spaced depending pins or projections 80. The outer end 79, of this lever latch, is in a position to be engaged by the semi-circular portion 64' when the neck 55 is in its raised or substantially vertical position shown in Fig. 11 and when in this position will raise the projections 80 against the action of the spring 81 positioned to engage the latch lever as shown more particularly in Figs. 11 and 12.

When the decoy is to be operated to simulate a duck in flight the user will engage the bill portion 58 and draw the same forwardly so that the neck portion 55 will assume the position shown in Fig. 12 and be held in that position by the hooks 69 of the apron or latch 67. When in this position the spring 65 will be placed under tension. Next the user or operator will open or spread the wings 70 to the positions shown in Fig. 10 and when in this position the latch lever 78 will be so positioned by the spring 81 as to position the projections 80 in the openings 75. This will hold the wings in their spread positions with the springs 72 under tension. The decoy will operate over an inclined cable, as shown in Figs. 1 and 2, and when the decoy reaches the water the apron or latch 67 will be swung on its pivot 68 to release the hooks 69 from the neck portion 55. When thus released the spring 65 will draw the neck portion 55 and head portion 57 back into the normal positions shown in Fig. 11 and the semi-circular member 64' will engage the raised portion 79 of the latch lever 78 and release the projections 80 from the opening 75 in the wings and the wings being thus released will be returned to their normal closed positions by the springs 72.

At 82 I have shown a plate covering the pivots for the wings as well as the latch lever 78.

Connected to the upper portion 46 of the body frame, by means of the projections 83 and 84, are the rings 85 and 86 to which wires or cables similar to the wires or cables 41, shown in Fig. 1, may be connected for connecting the decoy for operation on the inclined supporting cable.

From the above it will be noted that I have provided a novel form or forms of duck decoy adapted for operation to simulate a duck in flight or while resting on the water. When the decoy is to simulate the movements of a duck in flight the wings will be spread and held in such spread position, the neck and head portions being extended to project forwardly from the body portion. When the decoy contacts with the water at the end of the flight the neck and head portions are released and returned to their normal positions and in such return operating mechanism which holds the wings in spread position to release the same and to permit the return of the wings to their normal closed positions.

Having fully described my invention what I claim as new and desire to secure by Letters Patent is:

1. A decoy of the character described including body, neck and head portions, means for normally holding the neck and head portions relative to the body to simulate corresponding portions of a duck when at rest but adapted to be extended to positions simulating corresponding parts of a duck in flight, means for holding the neck and head portions in flight positions, and means for releasing said holding means on contact of the decoy with a surface on which it is to light.

2. A decoy of the character described including body, neck and head portions, means for normally holding the neck and head portions in raised positions but adapting the same to be moved to lowered extended positions, and means for holding the neck and head portions in lowered extended positions, said means being released by contact to permit return of the neck and head portions to their normal positions.

3. A decoy of the character described including body, neck and head portions, means for normally holding the neck and head portions in raised positions but adapting the same to be moved to lowered extended positions, means for holding the wings in closed position but adaptextended positions, said means being released by contact to permit return of the neck and head portions to their normal positions, wings connected to the body portion, means for normally holding the wings in closed positions but adapting the same to be extended to flight position, and means for holding the wings in extended flight position, said mean being released by return of the neck portion to normal position.

4. A decoy of the character described including body, neck and head portions, means for normally holding the neck and head portions in raised positions but adapting the same to be moved to lowered extended positions, and a pivoted member adapted to be engaged with the neck portion for holding the neck and head portions in lowered extended positions, said pivoted member being released by contact with the surface on which the decoy is to rest to permit return of the neck and head portions to their normal positions.

5. A decoy of the character described including body, neck and head portions, means for normally holding the neck and head portions in raised positions but adapting the same to be moved to lowered extended positions, a pivoted member adapted to be engaged with the neck portion for holding the neck and head portions in lowered extended positions, said pivoted member being released by contact with the surface on which the decoy is to rest to permit return of the neck and head portions to their normal positions, wings connected to the body portion, means for normally holding the wings in closed positions but adapting the same to be extended to flight position, and means for holding the wings in extended flight position, said means being released by contact of the neck portion therewith when said neck portion is returned to its normal position.

6. A decoy of the character described including body, neck and head portions, means for normally holding the neck and head portions in raised positions but adapting the same to be moved to lowered extended positions, a pivoted member adapted to be engaged with the neck portion for holding the neck and head portions in lowered extended positions, said pivoted member being released by contact with the surface on which the decoy is to rest to permit return of the neck and head portions to their normal positions, wings connected to the body portion, means for normally holding the wings in closed positions but adapting the same to be extended to flight position, and a pivoted latch for holding the wings in extended flight position, said pivoted latch being released by contact of the neck portion therewith when said neck portion is returned to its normal position.

7. A decoy of the character described including a body portion, a neck portion pivotally connected to the body, a head portion pivotally connected to the neck portion, yieldable means normally holding the neck and head portions in raised positions to correspond with positions of a neck and head of a duck at rest, but permitting lowering of the same to correspond with positions of the neck and head of a duck in flight, and means for holding the neck in lowered extended position, said means being pivotally connected to the body portion and adapted to be released on contact with a surface on which the decoy is to light and to permit return of the neck and head portions to their normal positions.

8. A decoy of the character described including a body portion, a neck portion pivotally connected to the body, a head portion pivotally connected to the neck portion, yieldable means normally holding the neck and head portions in raised positions to correspond with positions of a neck and head of a duck at rest, but permitting lowering of the same to correspond with positions of the neck and head of a duck in flight, means for holding the neck in lowered extended position, said means being pivotally connected to the body portion and adapted to be released on contact with a surface on which the decoy is to light and to permit return of the neck and head portions to their normal positions, wings pivotally connected to the body portion, means for normally holding the wings in closed position to extend parallel with the body portion but permitting the same to be extended to project laterally from the body portion, and means for holding the wings in their extended lateral positions, said means being released by engagement of the neck portion on its return to normal position to release the wings.

9. A decoy of the character described including a body portion, a neck portion pivotally connected to the body, a head portion pivotally connected to the neck portion, yieldable means normally holding the neck and head portions in raised positions to correspond with positions of a neck and head of a duck at rest, but permitting lowering of the same to correspond with positions of the neck and head of a duck in flight, means for holding the neck in lowered extended position, said means being pivotally connected to the body portion and adapted to be released on contact with a surface on which the decoy is to light and to permit return of the neck and head portions to their normal positions, wings pivotally connected to the body portion, means for normally holding the wings in closed position to extend parallel with the body portion but permitting the same to be extended to project laterally from the body portion, and a latch member for holding the wings in their extended lateral positions, said latch member being released by engagement of the neck portion on its return to normal position to release the wings.

10. A decoy of the character described including an air-tight body portion adapted to float on water, a neck portion pivotally connected to the body portion, a head portion pivotally connected to the neck portion, means for normally holding the neck and head portions in raised positions relative to the body but adapting the same to be moved to lowered extended positions, and means for holding the neck and body portions in lowered extended positions, said means being released by contact to permit return of the neck and head portions to their normal positions.

11. A decoy of the character described including an air-tight body portion adapted to float on water, a neck portion pivotally connected to the body portion, a head portion pivotally connected to the neck portion, means for normally holding the neck and head portions in raised positions relative to the body but adapting the same to be moved to lowered extended positions, means for holding the neck and head portions in lowered extended positions, said means being released by contact to permit return of the neck and head portions to their normal positions, wings connected to the body portion, means for normally holding the wings in closed position but adapting the same to be extended to open position, and means for holding the wings in extended open position, said means being released by contact of the neck portion on returning to its normal position.

12. A decoy of the character described including a body portion formed of upper and lower frame sections adapted to receive the body of a dead duck therebetween, neck and head portions adapted to respectively receive the neck and head portions of the dead duck, means for normally holding the neck and head portions in raised positions but adapting the same to be lowered to extended positions, and means for holding the neck and head portions in lowered or extended positions, said means being released by contact to permit return of the neck and head portions to their normal positions.

13. A decoy of the character described including a body portion formed of upper and lower frame sections adapted to receive the body of a dead duck therebetween, neck and head portions adapted to respectively receive the neck and head portions of the dead duck, means for normally holding the neck and head portions in raised positions but adapting the same to be lowered to extended positions, means for holding the neck and head portions in lowered or extended positions, said means being released by contact to permit return of the neck and head portions to their normal positions, wings connected to the upper frame section of the body portion, means for normally holding the wings in closed position but adapting the same to be extended to open position, and means for holding the wings in extended open position, said means being released by contact of the neck portion in returning to its normal raised position.

14. A decoy of the character described including a body portion formed of upper and lower sections pivotally connected and adapted to receive the body of a dead duck therebetween, a neck portion pivotally connected to the upper section of the body and adapted to receive the neck of the dead duck, a head portion pivotally connected to the neck portion and adapted to receive the head of the dead duck, means for normally holding the neck and head portions in raised positions but adapting the same to be moved to lowered extended positions, means for holding the neck and head portions in lowered extended positions, said means being released by contact to permit return of the neck and head portions to their normal positions, wings connected to the upper section of the body portion, means for normally holding the wings in closed position but adapting the same to be extended to open position, and means for holding the wings in extended open position, said means being released by contact of the neck portion in returning to its normal raised position.

GEORGE H. HUTAFF, Jr.